Patented Mar. 8, 1938

2,110,829

UNITED STATES PATENT OFFICE 2,110,829

PRODUCTION OF STYRENE AND RELATED COMPOUNDS

Robert R. Dreisbach, Midland, Mich., assignor to The Dow Chemical Company, Midland, Mich., a corporation of Michigan No Drawing. Application July 1, 1937, Serial No. 151,457

12 Claims. (Cl. 260—168)

The present application is a substitute for and continuation-in-part of my co-pending application, Serial No. 759,048, filed December 24, 1934.

The invention concerns an improved method of making styrene and its homologues by pyrolysis of alkylated aromatic hydrocarbons, e. g. ethylbenzene.

It is well known that styrene can be formed in accordance with the equation:—

$$C_6H_5CH_2CH_3 \rightarrow C_6H_5CH=CH_2 + H_2$$

by passing ethylbenzene vapors through a tubular reactor heated to a pyrolyzing temperature between 450° and 750° C. However, the yield of styrene by such procedure is always low and considerable material is lost through side reactions, resulting in the formation of carbon, tar, benzene, gaseous hydrocarbons, etc. The presence of carbon and tar in the reacted mixture seriously reduces the value of the latter for most commercial purposes, e. g. the preparation of resins, and when attempt is made to separate the styrene from such undesirable by-products, considerable styrene is usually lost through polymerization.

An object of the present invention is to provide a method whereby (1) ethylbenzene or other alkylated aromatic hydrocarbon may be pyrolyzed to produce styrene or an analogue thereof in good yield without appreciable carbonization or tar formation occurring, and (2) the styrene or analogue thereof may be converted to a resin without first being separated from the reaction mixture as an individual compound. Other objects of the invention will be apparent from the following description. The invention, accordingly, consists in the method hereinafter fully described and particularly pointed out in the claims.

The essential steps of my method, as applied to the production of styrene from ethylbenzene, consist in (1) mixing ethylbenzene with steam, superheated to a temperature above 700° C., preferably between 850° and 1200° C., to form a mixture having a temperature sufficiently high to pyrolyze the ethylbenzene, preferably between 800° and 850° C.; and (2) immediately cooling the mixture to a temperature below that at which pyrolysis occurs, e. g. below 700° C. The steam not only serves as an agent for heating the ethylbenzene but also acts catalytically to retard tar formation and carbonization of the organic materials. It is desirable, however, that the mixture be maintained at pyrolyzing temperatures above 700° C. momentarily, for example for a period of time not exceeding one second, preferably not exceeding 0.5 second, since longer heating at such high temperature usually results in carbonization and tar formation.

The ethylbenzene may be introduced either as a liquid or vapor into admixture with the steam, but in order to conserve steam I prefer to vaporize and preheat the ethylbenzene to a temperature approaching that at which pyrolysis occurs, e. g. to between 200° and 400° C., before mixing the same with the steam. The superheated steam may be employed at any temperature and in any proportion sufficient to heat the ethylbenzene to a pyrolyzing temperature. The minimum temperature at which the pyrolysis will proceed satisfactorily by my method varies somewhat with changes in the size and design of apparatus used in carrying out the reaction and time during which the mixture is maintained at a pyrolysis temperature. The reaction may be carried out at temperatures below 700° C., e. g. at 650° C., in which case catalysts such as activated charcoal, etc., may advantageously be employed to increase the reaction rate. In practice I prefer to control the temperature and proportion of steam so as to form a reaction mixture having a temperature above 800° but not exceeding 950° C., since at higher temperatures the yield of styrene is somewhat lower and the reacted mixture is frequently of dark color. However, where such dark color is not objectionable the reaction mixture may be formed at very high temperatures, e. g. as high as 1200° C., if desired.

In preparing styrene by my method, continuous streams of ethylbenzene and the superheated steam are mixed in the proportions necessary to form a mixture having a temperature above 700° C. whereby pyrolysis to form styrene occurs almost instantaneously. The mixture is cooled to a temperature below 700° C., within one second, preferably 0.5 second, after its formation. The desired cooling may be brought about in a number of ways, e. g. by directing the hot mixture into a cooling zone or against a cooled surface such as a water-cooled rotating drum or disk, by expanding the mixture after its formation, by injecting a stream or spray of water into admixture with the hot mixture, or by bringing the ethylbenzene and steam together in such carefully regulated proportions that the heat consumed in pyrolyzing the ethylbenzene together with the heat radiated from the mixture is sufficient to cool the mixture rapidly to a temperature below the pyrolyzing temperature, e. g. below 700° C.

The reacted vapor mixture is further cooled to a sufficiently low temperature so that the styrene and unreacted ethylbenzene contained therein are condensed. The residual gas, which consists largely of hydrogen along with a small proportion of gaseous hydrocarbons, e. g. ethylene, is collected as a valuable by-product from the reaction. The mixture of styrene and unreacted ethylbenzene may be fractionally distilled to separate the styrene as an individual compound. However, the mixture can, if desired, be used directly for the production of styrene resins by known methods, e. g. by heating the solution under pressure, whereby the styrene polymerizes to form a resin which usually remains dissolved in the ethylbenzene. The latter may then be separated from the resin, e. g. by distillation under vacuum or with steam, and again be pyrolyzed with superheated steam to produce an additional supply of styrene.

Although for sake of clarity, the above description has been restricted to the production of styrene and styrene resins from ethylbenzene, by similar procedure other alkylated aromatic hydrocarbons can be pyrolyzed to produce styrene or analogues of styrene, from which similar resins may be prepared. The principal products obtained by pyrolyzing a higher homologue of ethylbenzene are dependent largely on the particular compound subjected to the pyrolysis and upon the temperature at which the pyrolysis is carried out. For instance, by pyrolyzing isopropyl benzene at temperatures below 780° C. in accordance with the invention, alpha-methyl-styrene may be obtained as the major product and styrene as minor product, but by pyrolyzing the same compound at temperatures above 780° C., e. g. 800–900° C., styrene may be obtained as major product, relatively little, if any, alpha-methyl styrene being produced. By pyrolyzing secondary-butyl benzene at temperatures below 780° C., styrene and a considerable proportion of allyl benzene may be obtained, but by carrying the pyrolysis out at higher temperatures, e. g. 800–900° C., the yield of styrene may be increased and that of allyl benzene reduced or eliminated. Also, the pyrolysis of diethyl-benzene may be carried out in accordance with the invention to produce either or both of the compounds ethyl-vinyl-benzene and divinyl-benzene. In general, pyrolysis temperatures below 800° C. favor the formation of ethyl-vinyl-benzene and higher temperatures favor the formation of divinyl-benzene, but both compounds are usually obtained together.

Ordinarily an alkyl benzene containing an ethyl or higher alkyl radical but also containing a methyl or halogen substituent in the benzene nucleus will react in a manner similar to that of the corresponding hydrocarbon not containing the nuclear halogen or methyl substituent. For instance, the usual major product from the pyrolysis of 4-chloro-ethylbenzene is 4-chloro-styrene; that from pyrolysis of 2.4-dichloro-ethylbenzene is 2.4-dichloro-styrene; that from pyrolysis of 2-ethyl-toluene is 2-methyl-styrene, etc.

Alkyl-naphthalenes may be pyrolyzed in accordance with the invention to obtain vinyl-naphthalene or a homologue thereof. The products are usually those which would be expected in view of the foregoing description of the pyrolysis of various alkyl benzenes. For instance, ethyl-naphthalene may be pyrolyzed to obtain vinyl naphthalene, and isopropyl-naphthalene may be pyrolyzed to produce the compounds vinyl naphthalene and alpha-methyl-vinyl-naphthalene, the ratio between the two last-mentioned products being dependent largely upon the temperature at which the pyrolysis is carried out.

Insofar as I am aware, any alkylated aromatic hydrocarbon containing at least two carbon atoms in a side chain, or ring-halogenated derivative thereof, may be pyrolyzed by my method to produce styrene or a homologue or analogue thereof. During any such pyrolysis, dealkylation occurs to some extent with formation of by-products. For instance in the pyrolysis of ethyl-benzene to produce styrene some benzene is formed as a by-product; in the pyrolysis of di-ethyl-benzene some styrene and ethylbenzene are formed as by-products, etc. Such by-products can usually be separated by distillation from the major product.

The following example illustrates one way in which the principle of my invention has been applied, but is not to be construed as limiting the invention.

*Example*

Ethylbenzene was vaporized and preheated to about 160° C. 769 grams (7.25 moles) of the ethylbenzene vapors and 6 kilograms of highly superheated steam were passed in steady flow through a tubular iron reactor, wherein they formed a mixture having a temperature of 855° C. The time of passage was 17.5 minutes. The mixture passed through the reactor and into an efficient cooling apparatus at such rate as to be maintained at temperatures above 700° C. for only about 0.025 second. The mixture was cooled sufficiently to condense the liquid products comprising styrene, unreacted ethylbenzene, and water, leaving a gaseous mixture consisting largely of hydrogen mixed with some ethylene and methane. The oily layer of the condensate was separated and analyzed. It was found to contain 247 grams (2.38 moles) of styrene and 393 grams (3.71 moles) of unreacted ethylbenzene. The yield of styrene was 67 per cent of theoretical based on the ethylbenzene consumed in the treatment. No carbon or tar were found in the reacted mixture.

By similar procedure I have pyrolyzed diethyl-benzene, isopropyl-benzene, diisopropyl-benzene, ethyltoluene, and ethylchlorobenzene. In each instance styrene or a homologue or an analogue thereof was produced.

The pyrolysis of an alkylated aromatic hydrocarbon, or halogenated derivative thereof, by my method is usually carried out at atmospheric or slightly elevated pressures, i. e. at pressures below 50 pounds per square inch, but such pyrolysis may be carried out at lower or higher pressures.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. The method which comprises pyrolyzing an alkylated aromatic hydrocarbon, containing at least two carbon atoms in a side chain, by mixing the same with steam which has been superheated sufficiently to supply the heat of pyrolysis.

2. The method which comprises pyrolyzing ethylbenzene by mixing the same with steam which has been superheated sufficiently to supply the heat of pyrolysis.

3. The method which comprises mixing an alkylated aromatic hydrocarbon, which contains at least two carbon atoms in a side chain and which may also contain halogen substituents in the aromatic nucleus, with steam, superheated to a temperature above 700° C., to form a mixture thereof having a temperature sufficiently high to pyrolyze said hydrocarbon, and immediately cooling the mixture to a temperature below that at which rapid pyrolysis occurs.

4. The method which comprises mixing an alkylated aromatic hydrocarbon, containing at least two carbon atoms in a side chain, with steam superheated to a temperature between about 850° and about 1100° C., to form a mixture having a temperature between about 800° and about 950° C. and cooling the mixture immediately thereafter to a temperature below that at which rapid pyrolysis occurs.

5. The method which comprises passing continuous streams of an alkylated aromatic hydrocarbon, containing at least two carbon atoms in a side chain, and steam, the latter superheated to a temperature above 700° C., into admixture with each other at the respective rates required to form a mixture thereof at a pyrolyzing temperature above 700° C. and immediately passing said mixture into a cooling zone wherein it is cooled rapidly to a temperature below 700° C.

6. The method which comprises mixing an alkylated benzene, containing an alkyl radical having at least two carbon atoms, with steam superheated to a temperature above 800° C. to form a mixture thereof at a pyrolyzing temperature above 700° C. and immediately thereafter cooling the mixture to a temperature below 700° C.

7. The method which comprises mixing ethyl benzene with steam, superheated to a temperature between about 850° and about 1100° C., to form a mixture having a temperature between about 800° and about 950° C. and immediately thereafter cooling the mixture to a temperature below that at which rapid pyrolysis occurs.

8. The method which comprises passing continuous streams of vaporized ethylbenzene and steam, superheated to a temperature above 700° C., into admixture with one another at the respective rates required to form a mixture having a pyrolyzing temperature above 700° C. and immediately passing the mixture into a cooling zone wherein it is cooled rapidly to a temperature below 700° C.

9. The method which comprises passing continuous streams of vaporized ethylbenzene and steam, the latter being superheated to a temperature above 700° C., into and through an iron reaction chamber at the respective rates required to form a mixture having a pyrolyzing temperature above 700° C., and immediately after the hot reaction mixture flows from the reaction chamber cooling the same to a temperature below that at which pyrolysis occurs by contacting said mixture with water.

10. The method which comprises heating an organic starting material, selected from the class consisting of alkylated aromatic hydrocarbons which contain at least two carbon atoms in a side chain and which may also contain halogen substituents in the aromatic nucleus, to a pyrolyzing temperature above 700° C. by mixing the same with steam superheated to a temperature above 700° C., immediately thereafter cooling the mixture to a temperature below 700° C., continuing to cool the mixture to condense liquid products comprising a solution of an unsaturated compound, selected from the class consisting of styrene and its analogues, in unreacted organic starting material, causing said unsaturated compound to polymerize and form a resin, separating the unreacted organic starting material from the resin, and returning said unreacted starting material to the above-mentioned pyrolyzing step.

11. The method which comprises heating ethylbenzene to a pyrolyzing temperature above 700° C. by mixing the same with steam superheated to a temperature above 700° C., immediately thereafter cooling the mixture to a temperature below 700° C., continuing to cool the mixture to condense liquid products comprising a solution of styrene in unreacted ethylbenzene, causing styrene to polymerize and form a resin, separating the ethylbenzene from the resin and returning said unreacted ethylbenzene to the above-mentioned pyrolyzing step.

12. The method which comprises mixing a compound, selected from the class consisting of alkyl benzenes containing at least two carbon atoms in a side chain and nuclear chlorinated derivatives thereof, with steam superheated to a temperature above 700° C. to form a mixture thereof at a pyrolyzing temperature above 700° C. and immediately thereafter cooling the mixture to a temperature below 700° C.

ROBERT R. DREISBACH.